Aug. 11, 1970  E. K. ZORN  3,524,068

MOUNTING ASSEMBLY FOR LAMP AND PHOTOCELL UNITS

Filed Sept. 25, 1967

INVENTOR
EUGENE K. ZORN

ATTORNEY

United States Patent Office 3,524,068
Patented Aug. 11, 1970

3,524,068
MOUNTING ASSEMBLY FOR LAMP AND
PHOTOCELL UNITS
Eugene K. Zorn, Cornwall, Ontario, Canada, assignor
to Palleon Electronics Limited, Cornwall, Ontario,
Canada, a corporation of Canada
Filed Sept. 25, 1967, Ser. No. 670,316
Int. Cl. H01j 5/02; F21v 33/00
U.S. Cl. 250—239                                   7 Claims

ABSTRACT OF THE DISCLOSURE

A mounting assembly for a photocell operator unit that will allow either lamp or cell unit to be rotatably adjusted on separate horizontal and vertical axis for accurate focusing. This assembly is supported on an adapter bracket flush mounted in a standard electric switch box and the whole is enclosed by an inconspicuous and durable cover member that is independently attached also to the adapter bracket in a novel tamper resistant manner.

---

This invention relates to improvements in a mounting assembly for lamp and photocell units.

In operations controlled by photo-electric cells, it is essential that the mounting for both the ligh source and the cell be rigid and secure to achieve satisfactory and reliable functioning of the cell. It is desirable too that the mountings be as inconspicuous and tamper-proof as possible to prevent accidental damage and reduce vandalism.

Accordingly, it is an object of the invention to provide a mounting assembly for a lamp or cell in which the unit may be accurately pre-focused and firmly locked in proper adjustment.

A further object of the invention is to provide a mounting assembly for a precision focused lamp or cell that may be recesed in a standard electrical switch box or similar receptacle or set directly into a structural wall or partition.

A further object of the invention is to provide a mounting assembly having an inconspicuous and tamper-resisting cover plate.

A still further object is the provision of a mounting assembly of the nature and for the purpose described that is characterized by enhanced efficiency, enduring reliabilty and reasonable production and installation costs, whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throughout the several views.

When installing photocell operators, it is desirable that the companion lamp and photocell units be carefully focused and securely mounted. Nevertheless where the focusing adjustment is related to the cover mounting, trouble in maintenance is experienced as a cover that projects into a used area is subject to personal contact and displacement and also to tampering and vandalism. In the mounting assembly herein disclosed, it will be noted that (a) the lamp and cell units are recessed in the wall in precision focused position, (b) an inconspicuous and substantially flush cover plate encloses each unit and (c) the cover plate discourages tampering and moreover it is attached independently of the lamp and cell focusing adjustments.

The manner of attaching the present lamp or cell mounting assembly may vary widely depending on the nature of the wall or other supporting structure and so, as this description proceeds, it will be noted that the device is adaptable to a variety of applications.

Figure 1:
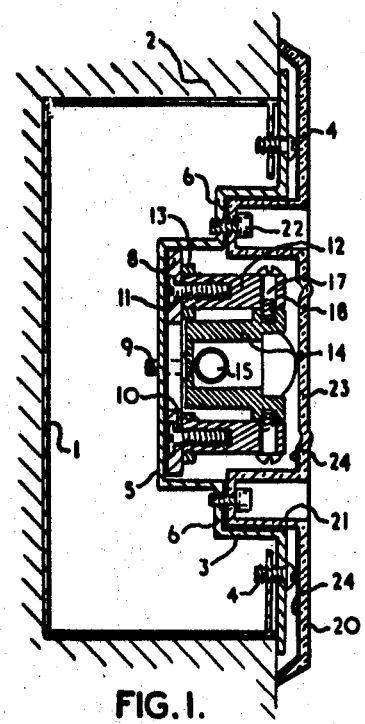
FIG. 1 is a vertical section of a preferred flush-mounted embodiment of the invention recessed in a standard electrical switch box.
Figure 2:
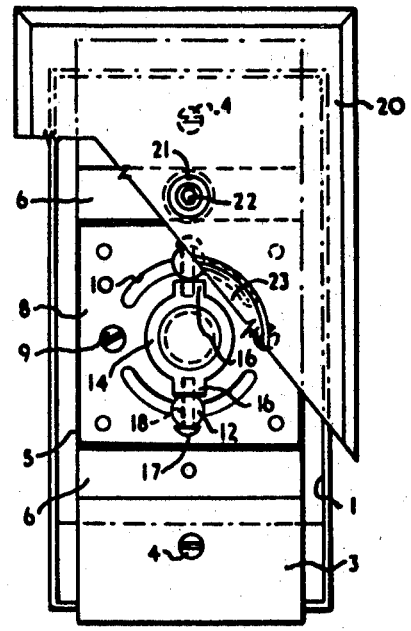
FIG. 2 is a front elevation thereof, with parts of the cover plate broken away.

Referring to the drawings, FIGS. 1 and 2 show a flush-mounted application of the invention with a lamp-carrying mounting assembly recessed in a standard electric switch box 1 set into a cavity in wall 2. An elongated, rectangular adapter bracket 3 is secured in the usual way by screws 4 to the top and bottom front wings of the box. It is formed with two steps at each end to provide a flat depressed nest of centre portion 5 and coplanar steps 6 between the depressed centre and the opposite ends that are secured as mentioned to the box wings.

A square base plate 8 fitting the depressed centre nest portion 5 is attached by screws 9 that thread into the adapter bracket 3, said plate having a pair of diametrically opposite arcuate slots 10 that are wider along opposite sides on the inner face of the plate. A flat headed screw 11 extends through each of these slots, its head being accommodated in the increased width of the slot on the inner side. Each screw is threaded into an axial bore in the near end of the mounting stud 12 whose lower, or near, end is exteriorly threaded and carries a lock nut 13 that coacts with the screw 11 to securely hold the stud 12 in any selected position along the slot 10 as it is adjusted about the axis of the plate.

The unit casing 14 of a light source lamp 15 is cradled between free or outer ends of said studs, i.e., the ends remote from said base plate 8, for which purpose the casing has a pair of diametrically opposite, interiorly threaded radial sockets 16 to receive cradle screws 17 passing though transverse bores 18 in the outer ends of the studs 12. Thus the lamp unit casing is so cradled that it is rotatably adjustable on an axis at right angles to the axis of the base plate about which the pair of spaced mounting studs in diametrically opposed relation are adjustable. This allows of the precision prefocusing of the lamp unit casing.

A cover 20 with a bevelled edge has a pair of longitudinally spaced wells 21, that reach to the bracket steps 6 when the cover is applied over the switch box 1. Through apertures in the bottom of these wells, Allen screws 22 pass into threaded bores in the steps 6. The cover lies substantially flush with the face of wall 2. It is flat and relatively inconspicuous being of a tough durable synthetic plastic such as a clear rugged polycarbonate or the like. Opposite the lamp unit casing the cover has a clear and translucent lens area 23 while the surrounding area is rendered opaque as by a coating 24 of aluminum on the inside. It is significant that the attachment of the cover 20 to the adapter bracket 3 is entirely independent of and in no ways connected with the universal focusing structure for the lamp unit casing.

The mounting assembly is useable in like manner where no electric switch box is available, the adapter bracket 3 being inserted in an accommodating wall cavity and the opposite ends are attached by wood screws, instead of machine screws 4, to the surface of the wall or partition.

Figure 3:
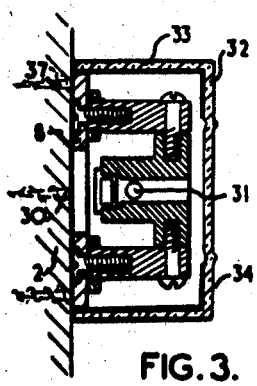
FIG. 3 is a vertical section of a surface-mounted embodiment of the invention.
Figure 4:
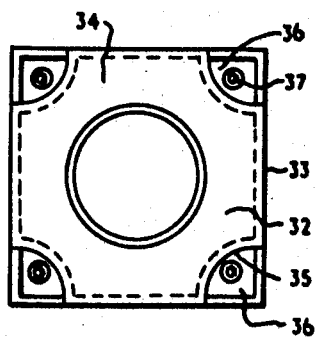
FIG. 4 is a front elevation thereof.
Figure 5:
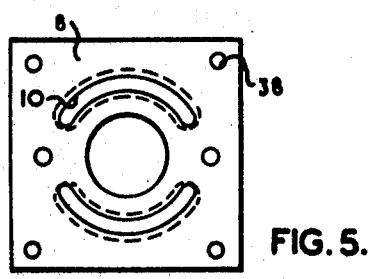
FIG. 5 is an elevation of the base plate.
Figure 6:
FIG. 6 is an enlarged section of one of the mounting studs.

In the modified showing, in FIGS. 3 and 4, the mounting assembly is applied on the surface of the wall or other supporting structure. No recessed switch box is available and no adapter bracket is employed. Instead the base plate 8 is fastened directly to the surface of the wall 2 by screws 30. Otherwise, the mounting assembly remains the same, except that a photocell unit casing 31 is shown, instead of the lamp unit casing, with different proportions but the same external measurements as regards its radial sockets for the mounting stud cradle screws. Because this installation of the mounting assembly is applied on the surface, the cover 32 has side walls 33 and a square face 34, being rendered opaque throughout save for the central translucent lens area. Each corner of the cover is provided with an arcuate recess 35 terminating at a level just above the plate 8 and through a bore in the platform 36 at the bottom of each arcuate recess an Allen screw 37 extends to thread into a threaded bore 38 in the underlying plate 8.

In use it will be seen that the initial or rough adjustment is made by the selected rotative positioning of the plate 8 and subsequent precision adjustment of the lamp or cell is achieved by the rotative positioning of the mounting studs 12 in the arcuate slots 10 and locking them with the screws 11 and nuts 13 and finally the casing 14 is minutely set and the cradle screws 17 turned tight. Flush mounted in a switch box or in a recess in the wall, the adapter bracket permits the perfect placement of the unit and with such a bracket, installation can be made in a partition having a thickness of only one inch. Even when surface mounting is resorted to, the assembly projects a mere one and one-eighth inch from the supporting well.

From the foregoing description taken in connection with the accompanying drawings, it will be manifest that a mounting assembly for lamp and photocell units is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

What is claimed as new is:

1. A mounting assembly for securing one of the units of a photocell operator in precision pre-focused adjustment comprising a base plate; a pair of spaced mounting studs projecting therefrom in diametrically opposed relation and adjustable about the axis of said plate, each stud having a transverse bore near its end remote from said plate; a photocell operator unit casing cradled between said studs said casing having a pair of interiorly threaded radial sockets, and a pair of aligned cradle screws passing through the bores in said studs and threaded into the sockets in said casing whereby the casing is rotatably adjustable on an axis at right angles to the axis of said plate.

2. A mounting assembly according to claim 1, wherein the base plate has a pair of diametrically opposite arcuate slots along which the studs are movable and a bolt extending through each slot and threadedly engaging in an axial bore in the near end of one of said studs.

3. The device according to claim 2, wherein the said near end of the stud with the threaded axial bore is also exteriorly threaded and carries a lock nut to coact with said bolt to securely affix said stud to said base plate in the desired position along said arcuate slot.

4. A mounting assembly according to claim 1, having an adapter bracket for flush mounting the assembly in a standard electric switch box and an inconspicuous and tamper-resisting cover applied to said bracket independently of said assembly, wherein said cover is a rugged one-piece member with a translucent lens area and a surrounding opaque area.

5. A mounting assembly according to claim 1 having an adapter bracket, for flush mounting the assembly in a standard electric switch box, wherein said bracket has a depressed nest in the center portion thereof in which nest said base plate is attached.

6. A mounting assembly according to claim 1, having an adapter bracket, for flush mounting the assembly in a standard electric switch box wherein said bracket has two steps at each end to provide a depressed nest in the center portion and spaced coplanar steps between the depressed center portion and the opposite ends, said base slate being attached in said nest and a cover separately and independently attached to said spaced coplanar steps.

7. The mounting assembly according to claim 6, wherein said cover has a pair of longitudinally spaced wells that reach to said spaced coplanar steps and Allen screws that pass through apertures in the bottom of said wells and into threaded bores in said steps.

References Cited

UNITED STATES PATENTS

| | | | |
|---|---|---|---|
| 1,537,780 | 5/1925 | Oefinger | 240—73 |
| 1,602,898 | 10/1926 | Godley | 240—44.2 |
| 2,214,317 | 9/1940 | Bash et al. | |
| 2,612,597 | 9/1952 | Sherrard. | |
| 2,665,330 | 1/1954 | Wong | 240—73 |

NORTON ANSHER, Primary Examiner

R. M. SHEER, Assistant Examiner

U.S. Cl. X.R.

240—2; 339—82, 122